(12) United States Patent
Zhu et al.

(10) Patent No.: US 11,749,861 B2
(45) Date of Patent: Sep. 5, 2023

(54) BATTERY BOX AND BATTERY MODULE

(71) Applicant: CONTEMPORARY AMPEREX TECHNOLOGY CO., LIMITED, Ningde (CN)

(72) Inventors: Tingting Zhu, Ningde (CN); Liwen Jiang, Ningde (CN); Zhenhua Zheng, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/149,818

(22) Filed: Jan. 4, 2023

(65) Prior Publication Data
US 2023/0145945 A1 May 11, 2023

Related U.S. Application Data

(63) Continuation of application No. 17/359,878, filed on Jun. 28, 2021, now Pat. No. 11,581,609, which is a
(Continued)

(30) Foreign Application Priority Data

Dec. 29, 2018 (CN) .......................... 201822254225.6

(51) Int. Cl.
*H01M 50/00* (2021.01)
*H01M 50/244* (2021.01)
(Continued)

(52) U.S. Cl.
CPC ....... *H01M 50/244* (2021.01); *H01M 50/204* (2021.01); *H01M 50/262* (2021.01)

(58) Field of Classification Search
CPC ............. H01M 50/577; H01M 50/262; H01M 50/204; H01M 50/247; H01M 50/24;
(Continued)

(56) References Cited

U.S. PATENT DOCUMENTS

| 4,758,704 A | 7/1988 | Hermann |
| 2012/0175900 A1 | 7/2012 | Rawlinson |

(Continued)

FOREIGN PATENT DOCUMENTS

| CN | 206076313 U | 4/2017 |
| CN | 207818670 U | 9/2018 |

(Continued)

OTHER PUBLICATIONS

Shen et al., Battery Module, Dec. 18, 2018. See the Abstract. (Year: 2018).*

(Continued)

*Primary Examiner* — Cynthia H Kelly
*Assistant Examiner* — Monique M Wills
(74) *Attorney, Agent, or Firm* — ANOVA LAW GROUP, PLLC

(57) ABSTRACT

A battery box includes at least two end plates, at least two side plates, and a plurality of welding members. One of the at least two end plates is provided between two adjacent side plates of the at least two side plates. The at least two end plates and the at least two side plates are connected to one another to enclose a cavity of the battery box. The plurality of welding members are formed by bending an end portion of an end plate of the at least two end plates multiple times. The end portion of the end plate is configured to implement the connection of at least two side plates and the at least two end plates to one another to enclose the cavity of the battery box. The plurality of welding members are configured to be welded to a corresponding side plate.

20 Claims, 3 Drawing Sheets

Related U.S. Application Data continuation of application No. PCT/CN2019/075822, filed on Feb. 22, 2019.

(51) Int. Cl.
*H01M 50/262* (2021.01)
*H01M 50/204* (2021.01)

(58) Field of Classification Search
CPC ............. H01M 50/231; H01M 50/224; H01M 50/271; H01M 50/27; H01M 50/23; H01M 50/22
See application file for complete search history.

(56) References Cited

U.S. PATENT DOCUMENTS

2017/0309877 A1  10/2017  Wu et al.
2018/0050607 A1  2/2018  Matecki et al.

FOREIGN PATENT DOCUMENTS

| CN | 109037527   | * 12/2018 | ............ H91M 50/20 |
| CN | 109037527 A |   12/2018 | |
| CN | 208189678 U |   12/2018 | |
| GB | 2227223 A   |    7/1990 | |

OTHER PUBLICATIONS

The World Intellectual Property Organization (WIPO) International Search Report and Written Opinion for PCT/CN2019/075822 dated Oct. 2019 12 pages (including English translation).
The Extended European Search Report for EP application No. 19902042.01 dated Mar. 10, 2022 44 pages.

\* cited by examiner

BATTERY BOX AND BATTERY MODULE

CROSS-REFERENCE TO RELATED APPLICATIONS

This application is a continuation of application Ser. No. 17/359,878, filed on Jun. 28, 2021, which is a continuation of International Application No. PCT/CN2019/075822, filed on Feb. 22, 2019, which claims priority to Chinese Patent Application No. 201822254225.6, filed with the Chinese Patent Office on Dec. 29, 2018. The disclosures of the aforementioned applications are hereby incorporated by reference in their entireties.

TECHNICAL FIELD

The present application relates to the field of battery technologies, and in particular, relates to a battery box and a battery module.

BACKGROUND

In recent years, the emergence of new energy vehicles has played an enormous role in promoting social development and environmental protection. A power battery pack is a rechargeable battery that is the power source for the new energy vehicles and is widely used in the field of new energy vehicles. Where, in order to ensure the overall structural strength of a battery pack and realize the safe driving of the vehicle, the structural strength of a box of a battery module located inside the battery pack is also particularly important. At present, end plates and side plates of the box of the battery module are usually welded together by butt-welding to enclose and form an accommodating cavity of the box of the battery module, to ensure that battery cells are stably installed in the box of the battery module. Or the structural strength of the box of the battery module is improved by increasing the thickness of a board.

Though the box of the battery module in the prior art can increase the strength of the connection between the end plates and the side plates to a certain extent, it has the following problems respectively. (1) The strength of the butt-welding is low, where the vibration occurred during the driving of the vehicle can easily cause the connection between the end plate and the side plate to be disconnected; and the method of butt-welding is easy to leak a laser, and the laser passes through the box will cause damage to the battery cell. (2) The overall structural strength of the box of the battery module may be ensure by increasing the thickness of the board, but the weight of the entire battery pack is greatly increased, thereby increasing the energy consumption of the vehicle.

SUMMARY

The purpose of the present application is to provide a battery box and a battery module, to alleviate the technical problem of low connection strength between an end plate and a side plate of the battery box in the prior art.

The present application is provided with a battery box, including:
at least two end plates;
at least two side plates, where one of the at least two end plates is provided between two adjacent side plates of the at least two side plates, and where the at least two end plates and the at least two side plates are connected to one another to enclose a cavity of the battery box;
a plurality of welding members, where the plurality of welding members are formed by bending an end portion of a side plate of the at least two side plates or an end portion of an end plate of the at least two end plates multiple times, where the end portion of the side plate or the end portion of the end plate is configured to implement the connection of at least two side plates and the at least two end plates to one another to enclose the cavity of the battery box;
where the plurality of the welding members are configured to be welded to a corresponding end plate or a corresponding side plate.

Further, the end portion of the side plate or the end portion of the end plate for enclosure is configured to bend twice to form two welding members.

Further, the two welding members are attached to each other.

Further, the end portion of the end plate for enclosure is configured to bend in a direction away from the cavity of the battery box to form a first welding member, and the end portion of the end plate for enclosure is configured to bend in the direction deviating from the adjacent side plate to form a second welding member.

Further, the plurality of welding members are located outside of the cavity of the battery box.

Further, a bottom portion of the end plate is configured to bend for at least once to form a first stiffening arm, and the first stiffening arm is perpendicular to one of the at least two side plates.

Further, a connecting member of the battery box is configured to connect to a case of a battery pack though the first stiffening arm.

Further, the first stiffening arm is located outside of the cavity of the battery box.

Further, a top portion of the end plates is configured to bend for at least once to form a second stiffening arm, the second stiffening arm is perpendicular to one of the at least two side plates, and the second stiffening arm is located outside of the cavity of the battery box.

Further, the side plate is configured to bend for multiple times to form a connecting arm, the connecting arm is perpendicular to one of the at least two end plates;
and a connecting member of the battery box is configured to connect to a case of a battery pack though the connecting arm.

Further, the connecting arm is located outside of the cavity of the battery box.

Further, the connecting arm is located in the middle portion of the side plate.

Further, the connecting arm includes:
two oppositely provided bending portions, where the two bending portions are provided with a plurality of connecting holes corresponding to each other;
and the connecting member of the battery box is configured to connect to the case of the battery pack though the plurality of connecting holes.

Further, the end plate and the side plate are connected by penetration welding, and a penetration welding area is configured to connect to the plurality of welding members and the end plate or the side plate;
where a welding seam is located at one side of the side plate away from the welding member.

Further, the plurality of welding members are provided in the connecting positions between an end plate and a side plate adjacent to each other.

Further, the battery box is made of a steel material or aluminum material.

The beneficial effects of the present application are:

the present application is provided with a battery box, and the battery box includes at least two end plates and at least two side plates; where one of the end plates is provided between the adjacent side plates, and the end plates and the side plates enclose and form a cavity of the battery box. Specifically, a plurality of welding members are formed by bending an end portion of the side plate and/or the end plate for enclosure for multiple times, and each of the welding members is welded to a corresponding end plate or side plate. When the end plate and the side plate are welded, a plurality of end plates and a plurality of side plates enclose and form the cavity of the battery box sequentially, where a plurality of welding members are provided in the connecting positions between the end plates and the side plates adjacent to each other. By the method of welding, each welding member is welded to a corresponding end plate or the side plate to improve the connection strength between the end plate and the side plate adjacent to each other. At the same time, since each welding member is formed by bending the end portion of the side plate and/or the end plate for enclosure for multiple times. That is, the end plate and/or the side plate and the welding member are integrally formed. Therefore, the robustness of the connecting position between the end plate and the side plate are further improved, and the occurrence of open welding at the connecting positions of the end plate and the side plate is reduced or even avoided.

The present application is provided with a battery module, which includes a plurality of battery cells stacked together and the foregoing battery box.

The beneficial effect of the present application is:

the battery module provided by the present application having the same advantages as the foregoing battery box, and it will not be repeated here.

Another aspect of the present disclosure provides an apparatus including the battery module according to any of the above embodiments, wherein the battery module is adapted to provide power for the apparatus.

BRIEF DESCRIPTION OF DRAWINGS

In order to illustrate the implementations of the present application or the technical solutions in the prior art more clearly, a brief description will be made below to the drawings required in the implementation of the present application or the prior art, and apparently, the drawings described below are some implementations of the present application, and other drawings could be obtained based on these drawings by those ordinary skilled in the art without creative efforts.

REFERENCE SIGNS

1-End plate;
   11-First stiffening arm;
   12-Second stiffening arm;
2-Side plate;
   21-Connecting arm;
      211-Bending portion;
      212-Connecting hole;
3-Cavity;
4-Welding member; and
5-Welding seam.

DESCRIPTION OF EMBODIMENTS

The technical solutions of the present utility model will be clearly and completely described below with reference to the accompanying drawings. Apparently, the described embodiments are some of, rather than all of, the embodiments of the present utility model. All other embodiments obtained by a person of ordinary skill in the art based on the embodiments of the present utility model without creative efforts shall fall within the protection scope of the present utility model.

In the description of the present utility model, it should be understood that orientations or positional relationships indicated by terms such as "inside" and "outside" are orientations or positional relationships shown based on the figures, and the terms are merely for convenience of describing the present utility model and for simplifying the description, but for indicating or implying that an indicated apparatus or element must have a specific orientation, and must be constructed and operated in a specific orientation, which thus may not be understood as limiting the present utility model.

In the description of the present utility model, it should be noted that unless otherwise explicitly specified and defined, the terms "mounting", "connecting" and "connection" should be understood in a broad sense, for example, they may be a fixed connection, a detachable connection, an integrated connection, may be a mechanical connection, or may be an electrical connection; may be a direct connection and may also be an indirect connection via an intermediate medium, or may be communication between the interiors of two elements. A person of ordinary skill in the art can understand specific meanings of the foregoing terms in the present utility model according to a specific situation.

Figure 1:
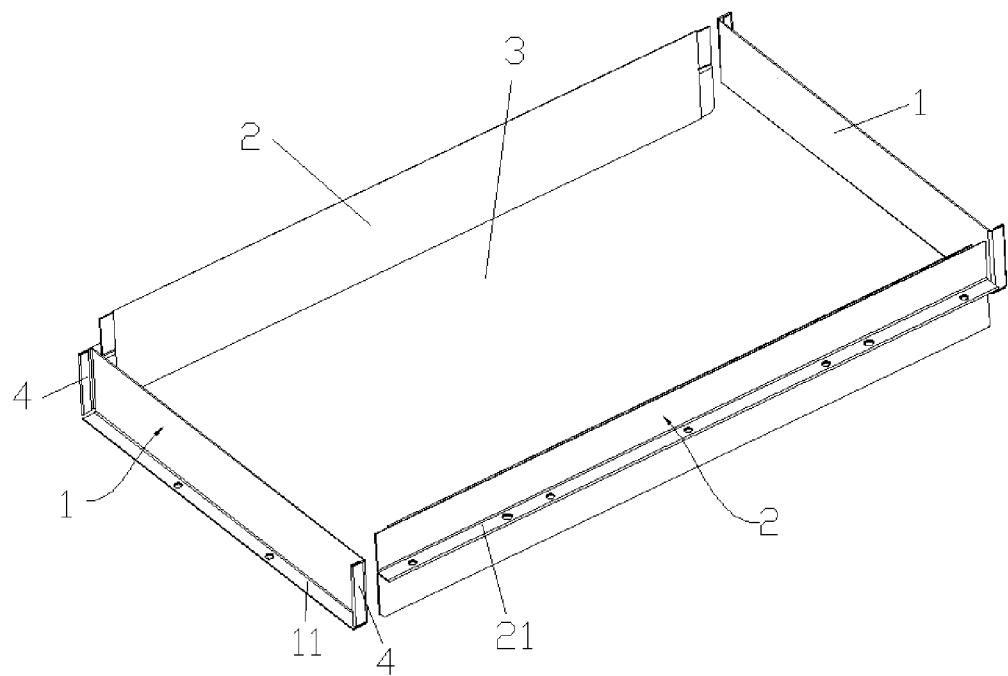
FIG. 1 is a structural schematic diagram of a battery box before assembly provided by an embodiment of the present application.
Figure 4:
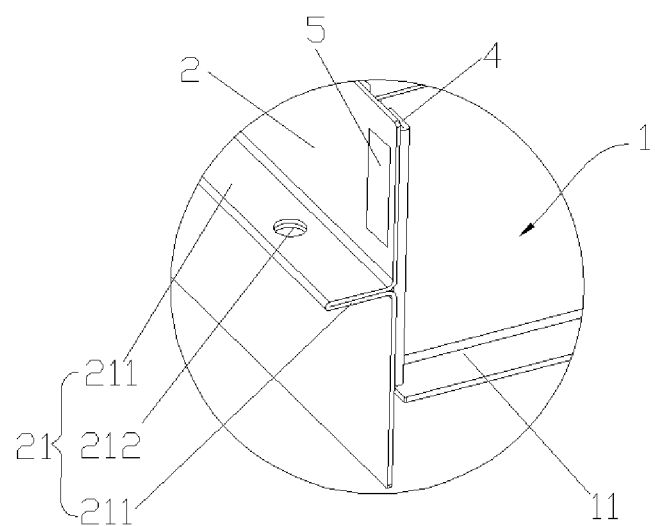
FIG. 4 is an enlarged view of A in FIG. 2.
Figure 5:
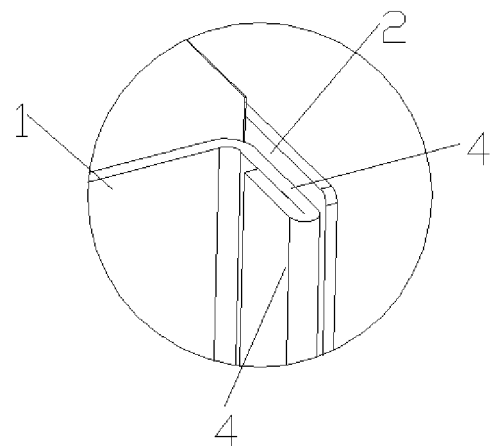
FIG. 5 is an enlarged view of B in FIG. 2.

Specifically, a battery module includes a battery box and a plurality of battery cells located in the battery box. As shown in FIG. 1, FIG. 4, and FIG. 5, in the present embodiment, the battery box includes at least two end plates 1 and at least two side plates 2, where an end plate 1 is provided between the adjacent side plates 2, and a cavity 3 of the battery box is enclosed and formed by the end plates 1 and the side plates 2. A plurality of battery cells stacked together are provided in the cavity 3, where a large surface of the battery cell faces the end plate 1. Specifically, a plurality of welding members 4 are formed by bending an end portion of the side plate 2 and/or the end plate 1 for enclosure for multiple times; and each of the welding members 4 is welded to a corresponding end plate 1 or side plate 2. When the end plate 1 and the side plate 2 are welded, a plurality of end plates 1 and a plurality of side plates 2 enclose and form the cavity 3 of the battery box sequentially.

Where a plurality of welding members are provided in the connecting positions between the end plate 1 and the side plate 2 adjacent to each other. By the method of welding, each welding member 4 is welded to the corresponding end plate 1 and the side plate 2 to improve the connection strength between the end plate 1 and the side plate 2 adjacent to each other. At the same time, since each welding member 4 is formed by bending the end portion of the side plate 2 and/or the end plate 1 for enclosure for multiple times. That is, the end plate 1 and/or the side plate 2 and the welding member 4 are integrally formed. Therefore, the robustness of the connecting positions the end plate 1 and the side plate 2 are further improved, and the occurrence of open welding at the connecting positions of the end plate 1 and the side plate 2 is reduced or even avoided.

Among them, the battery box can be made of aluminum material, steel material, etc. In order to further improve the overall strength of the battery box, and at the same time, to ensure that the battery box has better extensibility, in some embodiments, the battery box is made of a steel material in the present embodiment.

As shown in FIGS. 4 and 5, the end portion of the side plate 2 and/or the end plate 1 for enclosure is bent twice to form two welding members 4. In order to ensure the welding strength between the end plate 1 and the side plate 2 meets the design requirements or is beyond the design requirements, as well as simplifies the production and processing procedures, in some embodiments, the end portion of the side plate 2 and/or the end plate 1 for enclosure is bent twice to form two welding members 4 in the present embodiment. Further, a certain gap may be provided between the two welding members 4. To further improve the robustness of the connection between the welding member 4 and the corresponding end plate 1 or side plate 2, and reduce the occurrence of open welding, the two welding members 4 are attached to each other.

Figure 6:
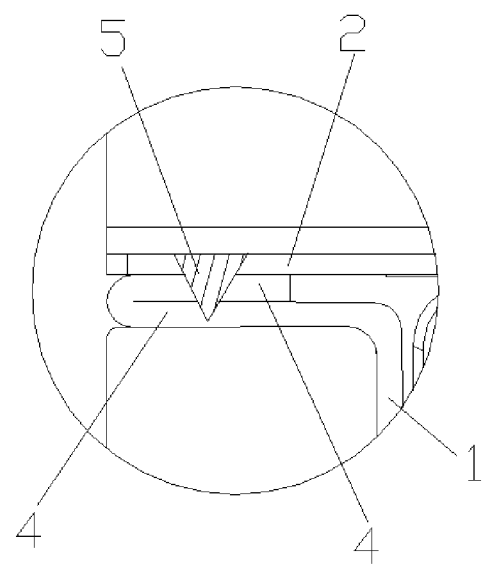
FIG. 6 is yet another structural schematic diagram of a battery box after assembly provided by an embodiment of the present application.

As shown in FIG. 5 and FIG. 6, further, for the purpose of improving the structural strength of the end plate 1 and reducing the occurrence of deformation of the end plate 1 when the battery cell expands in the X-axis direction, in the present embodiment, the end portion of the end plate 1 for enclosure is bent twice to form two welding members 4.

Among them, as shown in FIG. 6, an end surface of the end plate 1 for enclosure may be bent in the direction away from the cavity 3 of the battery box, and then continue to be bent in the direction toward its adjacent side plate 2 to form two welding members 4. In order to increase the volumetric energy density of the module, as shown in FIG. 5, in the present embodiment, the end portion of the end plate 1 for enclosure is bent in the direction away from the cavity 3 of the battery box to form a first welding member 4. The end portion of the end plate 1 for enclosure continues to be bent in the direction away from its adjacent side plate 2 to form a second welding member 4. Where, since the second welding member 4 is located in a fixed area of the end plate 1, no more space is occupied, such that the volume of the module used by the same specification of the battery cell is smaller.

As shown in FIG. 4 and FIG. 6, in the present embodiment, the method of welding may be penetration hot-melt welding. Specifically, the end plate 1 and the side plate 2 are connected by penetration welding. A penetration welding area is connected to the welding member 4 and the end plate 1 or the side plate 2. A welding seam 5 is located at one side of the side plate 2 away from the welding member 4. By welding along an end surface of the side plate 2 away from the welding member 4, it is convenient to weld a plurality of welding members 4 and the side plate 2 together. And at the same time, because there is a certain thickness formed between the side plate 2 and the welding member 4, the welding slag may also be prevented from splashing during the welding process.

Further, the welding member 4 may be located inside of the cavity 3 of the battery box. In the present embodiment, in order to improve the energy density, and prevent the welding member 4 from occupying the space in the battery box, the welding member 4 is located outside of the cavity 3 of the battery box.

Figure 2:
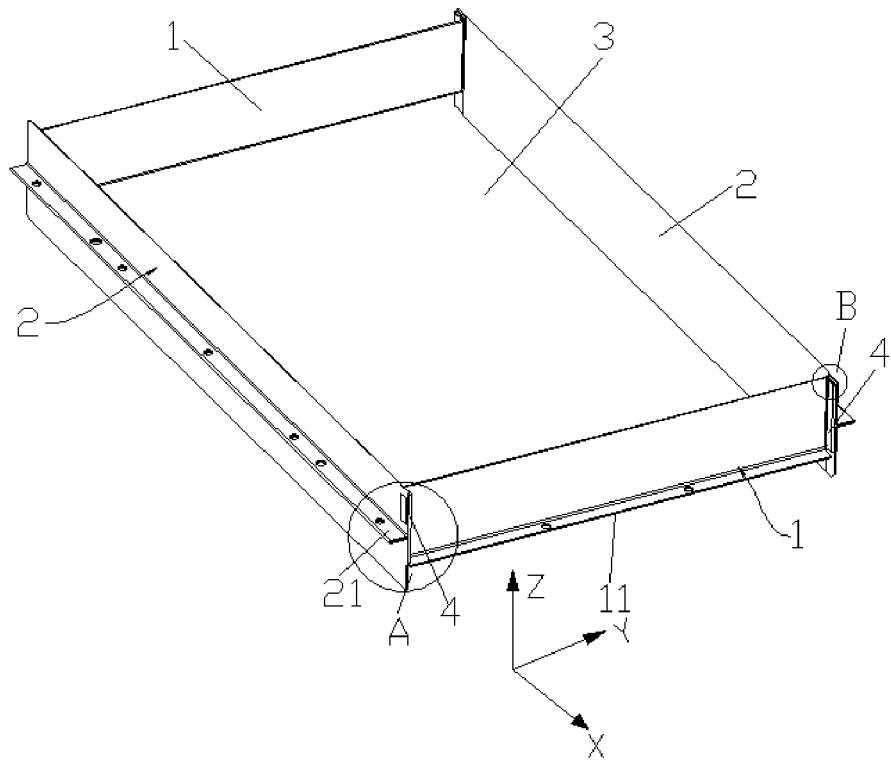
FIG. 2 is a structural schematic diagram of a battery box after assembly provided by an embodiment of the present application.
Figure 3:
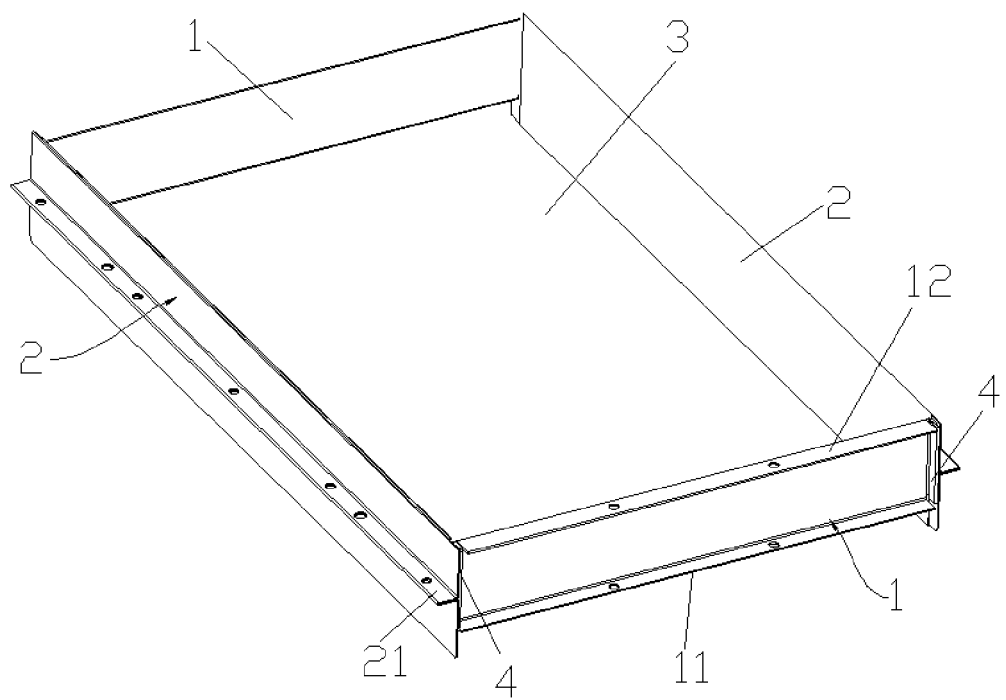
FIG. 3 is another structural schematic diagram of a battery box after assembly provided by an embodiment of the present application.

As shown in FIG. 1, FIG. 2 and FIG. 3, in the present embodiment, in order to further improve the structural strength of the end plate 1 so that the overall structural strength of the battery box is further improved, the end plate 1 is bent to form at least one first stiffening arm 11. Where the first stiffening arm 11 may be provided along a widthwise direction (Y-axis) of the battery box, or along a height direction (Z-axis) of the battery box. In order to improve the structural strength of the end plate 1 as well as further reduce or even avoid the occurrence of deformation of the end plate 1 when the battery cell expands along the X-axis direction, in some embodiments, the bottom portion of the end plate 1 is bent for at least once to form the first stiffening arm 11, and the first stiffening arm 11 is perpendicular to the side plate 2.

Further, in addition that the first stiffening arm 11 may improve the structural strength of the end plate 1, the connecting member can be connected to a case of a battery pack through the first stiffening arm 11, to fix the battery box and the case of the battery pack, and the connection fixing point of the battery box is provided, where the connecting member may be a bolt.

Among them, the first stiffening arm 11 may be located outside of the cavity structure of the battery box, may also be located inside of the cavity structure of the battery box. In the present embodiment, in order to improve the energy density, and prevent the first stiffening arm 11 from occupying the space in the battery box, the first stiffening arm 11 is located outside of the cavity of the battery box.

As shown in FIG. 3, in order to further improve the structural strength of the end plate 1, in the present embodiment, along the widthwise direction (Y axis) of the battery box, the top portion of the end plate 1 is bent at for at least once to form a second stiffening arm 12. The second stiffening arm 12 is located outside of the cavity 3 of the battery box, where the second stiffening arm 12 has the same function as the first stiffening arm 11. The function of the first stiffening arm 11 has been clearly described above, and will not be repeated here.

Further, in order to improve the strength of the side plate 2 and the robustness of the connection between the battery box and the case of the battery pack, in the present embodiment, the side plate 2 is bent for multiple times to form a connecting arm 21, and the connecting arm 21 is perpendicular to the end plate 1. Specifically, the connecting member of the battery box is connected to the case of the battery pack through the connecting arm 21.

Among them, the connecting arm 21 may be located inside of the cavity of the battery box. In the present embodiment, in order to improve the energy density and prevent the connecting arm 21 from occupying the space in the battery box, the connecting arm 21 is located outside of the cavity of the battery box bod.

As shown in FIG. 1, FIG. 2 and FIG. 3, further, the connecting arm 21 may be located at the bottom portion, middle portion or top portion of the side plate 2, to improve the stability of the connection between the connecting arm 21 and the case of the battery pack through the connecting member. In some embodiments, the connecting arm 21 is located in the middle portion of the side plate 2, where the connecting member may be a bolt.

As shown in FIG. 4, the side plate 2 may be bent for one or more times to form the connecting arm 21. In order to ensure the connection between the side plate 2 and the case of the battery pack while reducing the processing steps, in the present embodiment, the connecting arm 21 is formed by bending the side plate 2 twice. Specifically, the connecting arm 21 includes two oppositely provided bending portions 211, where the two bending portions 211 are provided with a plurality of connecting holes 212 corresponding to each other. The connecting arm 21 is connected to the case of the battery pack by the connecting members through the plurality of connecting holes 212.

The embodiments of the present disclosure further provide an apparatus, which includes a battery module according to any of the embodiments as described above, wherein the battery module is adapted to provide power for the apparatus. The apparatus may be an electric vehicle, a hybrid vehicle, an electric scooter, an electric cart or any other suitable devices which can include the battery module as their own power source.

Finally, it should be noted that the foregoing embodiments are merely intended for describing the technical solutions of the present utility model, but not for limiting the present utility model. Although the present utility model is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present utility model.

What is claimed is:

1. A battery box, comprising:
   at least two end plates;
   at least two side plates, wherein one of the at least two end plates is provided between two adjacent side plates of the at least two side plates, and wherein the at least two end plates and the at least two side plates are connected to one another to enclose a cavity of the battery box; and
   a plurality of welding members, wherein the plurality of welding members are formed by bending an end portion of an end plate of the at least two end plates multiple times, wherein the end portion of the end plate is configured to implement the connection of at least two side plates and the at least two end plates to one another to enclose the cavity of the battery box;
   wherein:
   the plurality of welding members are configured to be welded to a corresponding side plate;
   the end portion of the end plate for enclosure is configured to bend twice to form two welding members, wherein the end portion of the end plate for enclosure is configured to bend in a direction away from the cavity of the battery box to form a first welding member, and the end portion of the end plate for enclosure is configured to bend in a direction deviating from an adjacent side plate to form a second welding member; and
   the first welding member is perpendicular to other parts of the end plate except the end portion, the second welding member is parallel to the first welding member, and the second welding member and the first welding member are attached to each other.

2. The battery box according to claim 1, wherein the plurality of welding members are located outside of the cavity of the battery box.

3. The battery box according to claim 1, wherein a bottom portion of the end plate is configured to bend for at least once to form a first stiffening arm, and the first stiffening arms is perpendicular to one of the at least two side plates.

4. The battery box according to claim 3, wherein a connecting member of the battery box is configured to connect to a case of a battery pack though the first stiffening arm.

5. The battery box according to claim 3, wherein the first stiffening arm is located outside of the cavity of the battery box.

6. The battery box according to claim 1, wherein a top portion of the end plate is configured to bend for at least once to form a second stiffening arm, the second stiffening arm is perpendicular to one of the at least two side plates, and the second stiffening arm is located outside of the cavity of the battery box.

7. The battery box according to claim 1, wherein the side plate is configured to bend for multiple times to form a connecting arm, and the connecting arm is perpendicular to one of the at least two end plates.

8. The battery box according to claim 7, wherein a connecting member of the battery box is configured to connect to a case of a battery pack though the connecting arm.

9. The battery box according to claim 8, wherein the connecting arm comprises:
   two oppositely provided bending portions, wherein the two bending portions are provided with a plurality of connecting holes corresponding to each other; and
   the connecting member of the battery box is configured to connect to the case of the battery pack though the plurality of connecting holes.

10. The battery box according to claim 7, wherein the connecting arm is located outside of the cavity of the battery box.

11. The battery box according to claim 7, wherein the connecting arm is located in a middle portion of the side plate.

12. The battery box according to claim 1, wherein the end plate and the side plate are connected by penetration welding, and a penetration welding area is configured to connect to:
   the plurality of welding members, and
   the end plate or the side plate.

13. The battery box according to claim 12, wherein a welding seam is located at one side of the side plate away from the welding member.

14. The battery box according to claim 1, wherein the plurality of welding members are provided in connecting positions between an end plate and a side plate adjacent to each other.

15. The battery box according to claim 1, wherein the battery box is made of a steel material or aluminum material.

16. A battery module, comprising:
   a battery box, wherein the battery box comprise:
   at least two end plates;
   at least two side plates, wherein one of the at least two end plates is provided between two adjacent side plates of the at least two side plates, and wherein the at least two end plates and the at least two side plates are connected to one another to enclose a cavity of the battery box; and a plurality of welding members, wherein the plurality of welding members are formed by bending an end portion of an end plate of the at least two end plates multiple times, wherein the end portion of the end plate is configured to implement the connection of at least two side plates and the at least two end plates to one another to enclose the cavity of the battery box;

wherein:

the plurality of welding members are configured to be welded to a corresponding side plate;

the end portion of the end plate for enclosure is configured to bend twice to form two welding members, wherein the end portion of the end plate for enclosure is configured to bend in a direction away from the cavity of the battery box to form a first welding member, and the end portion of the end plate for enclosure is configured to bend in a direction deviating from an adjacent side plate to form a second welding member; and the first welding member is perpendicular to other parts of the end plate except the end portion, the second welding member is parallel to the first welding member, and the second welding member and the first welding member are attached to each other; and a plurality of battery cells stacked together and provided in the cavity.

17. The battery module according to claim 16, wherein the plurality of welding members are located outside of the cavity of the battery box.

18. The battery module according to claim 16, wherein a bottom portion of the end plate is configured to bend for at least once to form a first stiffening arm, and the first stiffening arms is perpendicular to one of the at least two side plates.

19. The module according to claim 16, wherein a top portion of the end plate is configured to bend for at least once to form a second stiffening arm, the second stiffening arm is perpendicular to one of the at least two side plates, and the second stiffening arm is located outside of the cavity of the battery box.

20. An apparatus, comprising a battery module adapted to provide power for the apparatus, the battery module comprising:

a battery box, wherein the battery box comprise:

at least two end plates;

at least two side plates, wherein one of the at least two end plates is provided between two adjacent side plates of the at least two side plates, and wherein the at least two end plates and the at least two side plates are connected to one another to enclose a cavity of the battery box; and a plurality of welding members, wherein the plurality of welding members are formed by bending an end portion of an end plate of the at least two end plates multiple times, wherein the end portion of the end plate is configured to implement the connection of at least two side plates and the at least two end plates to one another to enclose the cavity of the battery box;

wherein:

the plurality of welding members are configured to be welded to a corresponding side plate;

the end portion of the end plate for enclosure is configured to bend twice to form two welding members, wherein the end portion of the end plate for enclosure is configured to bend in a direction away from the cavity of the battery box to form a first welding member, and the end portion of the end plate for enclosure is configured to bend in a direction deviating from an adjacent side plate to form a second welding member; and the first welding member is perpendicular to other parts of the end plate except the end portion, the second welding member is parallel to the first welding member, and the second welding member and the first welding member are attached to each other; and a plurality of battery cells stacked together and provided in the cavity.

* * * * *